US009300687B2

(12) United States Patent
Johns et al.

(10) Patent No.: US 9,300,687 B2
(45) Date of Patent: Mar. 29, 2016

(54) MANAGING ACCESS TO SECURED CONTENT

(71) Applicants: Martin Johns, Karlsruhe (DE); Sebastian Lekies, Karlsruhe (DE)

(72) Inventors: Martin Johns, Karlsruhe (DE); Sebastian Lekies, Karlsruhe (DE)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 13/959,951

(22) Filed: Aug. 6, 2013

(65) Prior Publication Data

US 2015/0047051 A1    Feb. 12, 2015

(51) Int. Cl.
*H04L 29/06* (2006.01)
*H04W 12/08* (2009.01)
*H04L 29/12* (2006.01)

(52) U.S. Cl.
CPC ............ *H04L 63/1483* (2013.01); *H04L 63/10* (2013.01); *H04W 12/08* (2013.01); *H04L 61/1511* (2013.01)

(58) Field of Classification Search
CPC ...................................................... H04L 63/10
See application file for complete search history.

(56) References Cited

U.S. PATENT DOCUMENTS

| 8,434,149 B1 * | 4/2013 | Satish ................. G06F 21/6227 726/22 |
| 2014/0075553 A1 * | 3/2014 | Hansen ............... H04L 61/1511 726/22 |

OTHER PUBLICATIONS

A. Bortz, et al., "google-dnswall," retrieved from the internet: http://code.google.com/p/google-dnswall/, [retrieved on Sep. 11, 2013] 1 page.
J. Soref, DNS: Spoofing and Pinning, retrieved from internet: http://web.archive.org/web/20100211170613/http:/viper.haque.net/~timeless/blog/11/, [retrieved on Sep. 12, 2013], 1 page.
J. Grossman, et al. "XSS Attacks: Cross Site Scripting Exploits and Defense," Syngress, 2007, 482 pages.
Anderson, Why Web Brwoser DNS Caching Can Be a Bad Thing, retrieved from the internet: http://dyn.com/blog/web-browser-dns-caching-bad-thing/ , Sep. 7, 2011, 4 pages.
Dean et al., Java Security: From Hot-Java to Netscape and Beyond, In Proceedings of the 1996 IEEE Symposium on Security and Privacy, IEEE Computer Society, 1996, 11 pages.
Dutta, Client-side Cross-domain Security, retrieved from the internet: http://msdn.microsoft.com/en-us/library/cc709423(v=vs.85).aspx [retrieved Jul. 17, 2013], 2011, 31 pages.
Google Inc., The Chromium Projects, retrieved from the internet: http://www.chromium.org/ [retrieved Jul. 17, 2013], 1 page.

(Continued)

*Primary Examiner* — Zachary A Davis
*Assistant Examiner* — Devin Almeida
(74) *Attorney, Agent, or Firm* — Fish & Richardson P.C.

(57) ABSTRACT

Techniques for preventing unauthorized access to protected network resources include accessing, from a client appliance connected in a distributed network, a computing appliance through the world wide web, the computing appliance including a DNS server addressed by a particular domain name; receiving, from the computing appliance, a portion of code at the client appliance through a web browser of the client appliance, receiving, to a server appliance connected in the distributed network, a request to access secure content stored on the server appliance by the portion of code; comparing the domain name of the DNS server with a server-origin of the secure content; and based on the domain name of the DNS server being exclusive of a set of server-origin values that includes the server-origin, denying access to the request.

17 Claims, 3 Drawing Sheets

(56) References Cited

OTHER PUBLICATIONS

Grossman et al., Hacking Intranet Websites from the Outside, Aug. 3, 2006, 36 pages.
C. Heffner, How to Hack Millions of Routers, retrieved from the internet: http://media.blackhat.com/bh-us-10/presentations/Heffner/BlackHat-USA-2010-Heffner-How-to-Hack-Millions-of-Routers-slides.pdf, 2010, 89 pages.
I. Hickson, W3C, HTML5, A vocabulary and assicated APIs for HTML and XHTML, retrieved from the internet: http://www.w3.org/TR/html5/, May 2012, 22 pages.
J. Hirth, It's Time to Rethink the Default Cache Size of Web Browsers, retrieved from the internet: http://kaioa.com/node/74, Jun. 12, 2008, 4 pages.
Hodges et al., HTTP Strict Transport Security (HSTS), Internet Engineering Task Force (IETF), retrieved from internet: http://tools.ietf.org/html/rfc6797, Nov. 2012, 46 pages.
Jackson et al., Beware of Finer-Grained Origins, retrieved from the internet: http://w2spconf.com/2008/papers/s2p1.pdf, 2008, 7 pages.
Jackson et al., Protecting Browsers from DNS Rebinding Attacks, ACMS Transactions on the Web, vol. 3, No. 1, Article 2, Jan. 2009, 26 pages.
Johns, Using Java in anti DNS-pinning attacks (Firefox and Opera). retrieved from the internet: http://shampoo.antville.org/stories/1566124/, Feb. 2007, 1 page.
Kanatoko, Anti-DNS Pinning (DNS Rebinding) + Socket in Flash, retrieved from the internet: http://www.jumperz.net/index.php?i=2&a=3&b=3, 1998, 3 pages.
Karlof et al, Dynamic Pharming Attacks and the Locked Same-origin Policies for Web Browsers, In Proceedings of the 14th ACM Conference on Computer and Communication Security, Nov. 2007, pp. 58-71.
Maone, NoScript Firefox Extension, retrieved from the internet: http://noscript.net/, 2012, 4 pages.
Megacz, XWT Foundation Advisory: Firewall circumvention possible with all browsers, retrieved from the internet: http://seclists.org/bugtraq/2002/Jul/362, Jul. 2002, 4 pages.
Megacz, X-Request Origin (Internet Draft), retrieved from the internet: http://tools.ietf.org/html/draft-megacz-x-requestorigin-00, Jun. 2003, 5 pages.
Microsoft, IE8 Security Part VII: ClickJacking Defenses, retrieved from the internet: http://blogs.msdn.com/b/ie/archive/2009/01/27/ie8-security-part-vii-clickjacking-defenses.aspx, Jan. 27, 2009, 11 pages.
Mueller, Sun's Response to DNS spoofing attack, retrieved from the internet: http://sip.cs.princeton.edu/news/sun-02-22-96.html, Feb. 1996, 3 pages.
Princeton University, DNS Attack Scenario, retrieved from the internet: http://sip.cs.princeton.edu/news/dns-scenario.html, Feb. 1996, 3 pages.
Rekhter et al., Address Allocation for Private Internets, retrieved from internet: http://www.ietf.org/rfc/rfc1918.txt, Feb. 1996, 9 pages.
Statowl, Rich Internet Application Market Share, retrieved from the internet: http://www.statowl.com/custom_ria_market_penetration.php, retrieved on Jul. 17, 2013, 2 pages.
Rios et al, Slipping Past the Firewall, 2007, 35 pages.
Roskind, Attacks Against the Netscape Browser, RSA Conference, Apr. 2001, 35 pages.
Ross, Notes on DNS Pinning, MSDN Blogs, retrieved from the internet: http://blogs.msdn.com/b/dross/archive/2007/07/09/notes-on-dns-pinning.aspx, Jul. 9, 2007, 1 page.
Ruderman, The Same Origin Policy, retrieved from the internet: http://www-archive.mozilla.org/projects/security/components/same-origin.html, Aug. 24, 2001, 3 pages.
Sterne, Content Security Policy. W3C Working, Draft, W3C, Nov. 20, 2012, 9 pages.
Stuttard, Whitepaper—DNS Pinning and Web Proxies, Jul. 10, 2007, 1 page.
Uhley, Flash Content and the same-origin policy, Adobe Secure Software Engineering Team (ASSET) Blog, Nov. 2009, 3 pages.
Ulevitch, Finally, a real solution to DNS rebinding attacks, OpenDNS Blog, retrieved from the internet at: http://blog.opendns.com/2008/04/14/finally-a-real-solution-to-dns-rebinding-attacks/, Apr. 2008, 3 pages.
Kesteren, Cross-Origin Resource Sharing, W3C Working Draft, Version WD-cors-20100727, retrieved from the internet: http://www.w3.org/TR/2010/WD-cors-20100727/, Jul. 2010, 21 pages.
W3C, Same Origin Policy, retrieved from the internet:http://www.w3.org/Security/wiki/Same_Origin_Policy, retrieved on Jul. 17, 2013, 3 pages.
Johns, (somewhat) breaking the same-origin policy by undermining DNS-pinning, Aug. 14, 2006, 2 pages.
D. Byrne, Anti-DNS Pinning and Java Applets, Jul. 9, 2007, 2 pages.

* cited by examiner

MANAGING ACCESS TO SECURED CONTENT

TECHNICAL BACKGROUND

This disclosure describes systems, methods, and apparatus for managing access to secured content and, more particularly, preventing unauthorized access to network resources based on a domain name system (DNS) Rebinding attack.

BACKGROUND

The functionality demands of an ever expanding World Wide Web application paradigm have caused web browsers to evolve from a simple program to display hypertext documents into a full-fledged runtime environment for sophisticated, networked applications. This evolution is still in full effect, with HTML5 and related JavaScript APIs being the latest addition to the browser model. In the context of Web applications, fundamental security properties are governed by the Same-Origin Policy (SOP). The SOP is one of the Web's principal security policy. It provides origin-based isolation of mutually distrusting Web applications.

Low-level vulnerabilities have become considerably harder to find and exploit. Hence, the ever growing capabilities of the Web browser make it an increasingly interesting offensive tool for attackers. The Web browser runs behind the firewall within the boundaries of the internal network and executes code that was retrieved from the Internet. Thus, the SOP constitutes, in some cases, the only barrier between attacker-provided code and protected resources in an internal network. The SOP may, however, be far from perfect. In some cases, attacker controlled DNS settings may be utilized to subvert the policy (e.g., a DNS Rebinding attack). DNS Rebinding remains a constant problem of the SOP that was (re)discovered multiple times and, subsequently, attempted to be fixed. Indeed, in some instances, the HTML5 Offline Application Cache can be misused to conduct reliable DNS Rebinding attacks.

SUMMARY

The present disclosure relates to computer-implemented methods, computer-readable media, and computer systems for preventing unauthorized access to protected network resources includes accessing, from a client appliance connected in a distributed network, a computing appliance through the world wide web, the computing appliance including a DNS server addressed by a particular domain name; receiving, from the computing appliance, a portion of code at the client appliance through a web browser of the client appliance, receiving, to a server appliance connected in the distributed network, a request to access secure content stored on the server appliance by the portion of code; comparing the domain name of the DNS server with a server-origin of the secure content; and based on the domain name of the DNS server being exclusive of a set of server-origin values that includes the server-origin, denying access to the request.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. A first aspect combinable with any of the general implementations further includes, prior to the comparison, caching the portion of code in a memory portion of the client appliance; and deleting, at the client appliance, information associated with an IP-to-DNS mapping of the portion of code.

A second aspect combinable with any of the previous aspects further includes re-accessing, from the client appliance connected in the distributed network, the computing appliance through the world wide web; loading the portion of code from the memory portion of the client appliance; and receiving the request to access secure content at the server appliance by the cached portion of code.

In a third aspect combinable with any of the previous aspects, the memory portion includes an HTML5 Application Cache in a web browser on the client appliance.

In a fourth aspect combinable with any of the previous aspects, the portion of code includes a script and a manifest file.

A fifth aspect combinable with any of the previous aspects further includes interpreting, at the client appliance, the manifest file; and caching the script in the memory portion of the client appliance according to the interpreted manifest file; and saving the script in the cache, based on the interpreted manifest file, subsequent to shut down of the web browser.

In a sixth aspect combinable with any of the previous aspects, the portion of code includes at least one of a JavaScript, an applet, a viewport, or an XmlHttpRequest.

In a seventh aspect combinable with any of the previous aspects, the portion of code is defined by a first application layer protocol and a first port associated with the portion of code.

An eighth aspect combinable with any of the previous aspects further includes (i) comparing the first protocol to a second application layer protocol of the secure content; (ii) comparing the first port to a second port associated with the secure content; (iii) comparing the particular domain name to a domain name associated with the secure content; based on at least one of the comparisons in (i)-(iii) not returning an exact match, denying access to the request.

In a ninth aspect combinable with any of the previous aspects, the domain name associated with the secure content matches the particular domain name based on DNS Rebinding.

In a tenth aspect combinable with any of the previous aspects, the step of comparing the domain name of the DNS server with a server-origin of the secure content is performed only through the web browser of the client appliance.

In an eleventh aspect combinable with any of the previous aspects, an application layer of the server appliance is unaltered.

In a twelfth aspect combinable with any of the previous aspects, the set of server-origin values includes one or more subdomains of the server-origin.

A thirteenth aspect combinable with any of the previous aspects further includes granting access to the request based on the particular domain name matching at least one of the one or more subdomains of the server-origin.

A fourteenth aspect combinable with any of the previous aspects further includes determining that the set of server-origin values is empty; and based on the determination that the set of server-origin values is empty, granting access to the secure content.

A fifteenth aspect combinable with any of the previous aspects further includes receiving, from the server appliance, the server-origin at the web browser of the client appliance.

In a sixteenth aspect combinable with any of the previous aspects, the received server-origin is part of an HTTP response header delivered from the server appliance to the client appliance in a comma-separated list.

In a seventeenth aspect combinable with any of the previous aspects, the HTTP response header includes an X-Server-Origin response header.

In an eighteenth aspect combinable with any of the previous aspects, the particular domain name includes one of a plurality of domain names of the DNS server, and the portion of code includes an HTML document and manifest hosted on the particular domain name and an active content hosted on another of the plurality of domain names.

Various implementations of techniques for preventing unauthorized access to network resources as described in the present disclosure may include none, one, some, or all of the following features. For example, techniques for preventing unauthorized access to network resources may extend the SOP in a non-disruptive manner to further protect network resources against an attack, such as a DNS Rebinding attack. Such techniques may protect resources, for example, in a distributed environment with multiple domain names or domain relaxation. As another example, such techniques may provide for a fundamental solution for protecting network resources against, for example, a DNS Rebinding attack. In some aspects, such techniques may provide for a client-side security policy where aspects (e.g., all or some) of the policy decision and enforcement process are conducted in a Web browser on a client appliance. Further, such techniques may be implemented so as to avoid that Web applications have to explicitly implement protection or decision logic on the server-side's application layer. For instance, such techniques may provide transparent protection by default on the protocol layer. As another example, such techniques for preventing unauthorized access to network resources may utilize dedicated functionality rather than, for instance, relying on non-security features (e.g., a host header). Also, such techniques may be backwards compatible so that, if a given application scenario involves an entity (e.g., Web server or browser) that does not such techniques, the Web application functions as desired and the security properties transparently revert to a currently established state (e.g., a non-extended SOP).

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
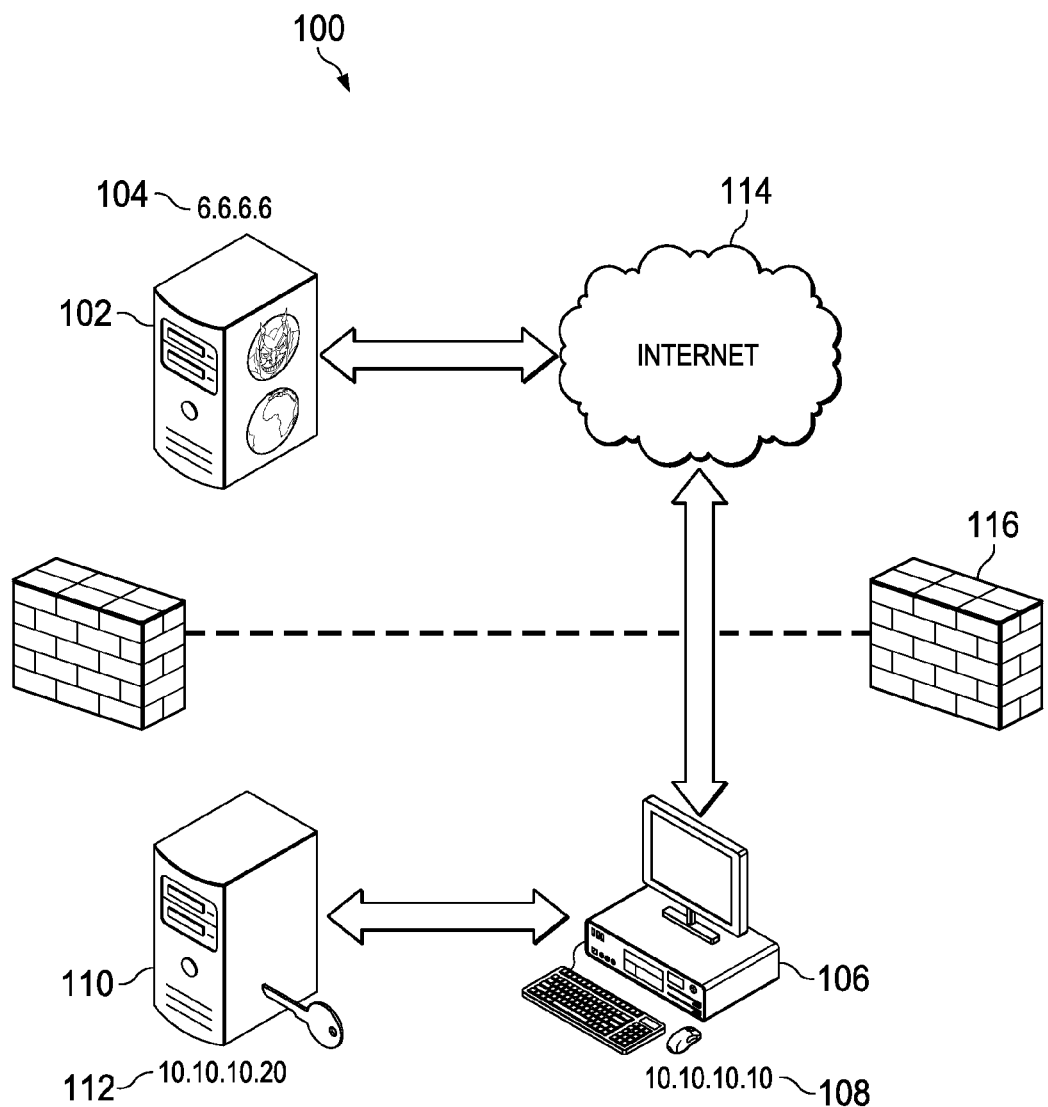
FIG. 1 illustrates an example system architecture in accordance with implementations of the present disclosure.

Implementations of the present disclosure are generally directed to techniques for preventing unauthorized access to network resources by extending the SOP in a non-disruptive manner to protect network resources against an attack, such as a DNS Rebinding attack. In some implementations, the SOP is extended (e.g., an extended SOP, or eSOP) to include Web server-provided input. For example, in some aspects of the eSOP, a Web origin that can be checked to protect against a DNS Rebinding attack includes information that indicates an origin of a server (or other appliance) from which Web content originates. For instance, the conventional triple-based SOP (e.g., {protocol, domain, port}) is extended to include a fourth component that is provided by a server (e.g., a Web server domain). For example, HTTP responses of a given server carry explicit, server-provided information of the server's trust boundaries, or "server-origin." Thus, in the eSOP, a Web origin consists of the quadruple {protocol, domain, port, server-origin}. In consequence, when a browser (e.g., Internet Explorer, Chrome, Safari, Opera, Firefox) conducts an eSOP check for access to secure content, not only does the protocol/domain/port triple have to match, but also the server-origin values. For example, a script may execute under the origin {http, example.org, 80, example.org}. This script attempts to access a document in an iframe that also has the origin {http, example.org, 80, example.org}. Because all four elements of the respective Web origins match, the eSOP is satisfied, and the access is granted to the iframe.

Of course, Web applications can be accessed via multiple domain names. For instance, many Web applications do not distinguish between the main domain name (e.g., example.org) and its "www" counterpart (e.g., www.example.org). Similar scenarios exist for applications accepting requests for multiple top-level domains (e.g., example.com and example.net). Hence, for resources served by such applications, it may not be straight forward to decide what their corresponding server-origin. In some aspects, the eSOP does not require the implementation of application-layer decision logic on the server-side. Thus, the eSOP allows server-side configuration on the protocol-layer and permits that the server specifies more than one domain value as its server-origin. In some aspects, therefore, the server-origin precisely specifies a server's trust boundaries, e.g., the set of domains which it grants access in a same-origin context. In some aspects, the criteria under which two Web origin quadruples comply to the eSOP is satisfied if, and only if, the protocol/domain/port values of both quadruples match (e.g., exactly) and the domain value of the acting origin (e.g., the origin of the script) is included in (e.g., is an element of a set of) the server-origin of the resource that the script tries to access.

For example, a Web application available via example.org and www.example.org specifies its server-origin as a tuple of both domains: {example.org, www.example.org}. A script running in a document under the origin {http, example.org, 80, <example.org, www.example.org>} tries to access a document in, for example, an iframe that also has the origin {http, example.org, 80, <example.org, www.example.org>}. Under the eSOP, as the script's domain value (example.org) is included in the target document's server-origin list <example.org, www.example.org>, the quadruple is satisfied and, thus, access is granted to the document in the iframe.

Turning now to FIG. 1, this figure illustrates an example computing system 100 in accordance with implementations of the present disclosure. For example, in some aspects, the system 100 may implement the eSOP as described above and as further described below to protect network resources against an attack, such as a DNS Rebinding attack or other form of Web-based attack. As illustrated, system 100 includes an attacker server 104 located at an attacker IP address 104 (e.g., 6.6.6.6 in this example); a victim client 106 located at a client IP address 108 (e.g., 10.10.10.10 in this example); and a victim server 110 located at a server IP address 112 (e.g., 10.10.10.20 in this example). As illustrated, the attacker server 102 is communicably coupled to the victim client 106 through a network 114. A firewall 116 virtually separates the victim "system" (e.g., the victim client 106 and the victim server 110) from the attacker server 102.

Generally, at a high level, each of the attacker server 102, the victim client 106, and the victim server 110 comprise electronic computing apparatus that include, for instance, one or more processors, one or more memory modules, and an interface, among other components not shown here (e.g., input and output devices, graphical user interfaces (GUIs), and otherwise). For example, the attacker server 102 and the victim server 110 may each store data (e.g., in a database), applications (e.g., hosted or otherwise), as well as scripts and other executable code. In some aspects, one or both of the attacker server 102 and the victim server 110 may comprise a web server with one or more web-based applications accessed and executed via the network 114 by the victim client 106. At a high level, one or both of the attacker server 102 and victim server 110 comprises an electronic computing device or computer operable to receive, transmit, process, store, or manage data and information associated with the system 100. As used in the present disclosure, the term "computer" is intended to encompass any suitable processing device. For example, although FIG. 1 illustrates a single attacker server 102 and a single victim server 110, system 100 can include two or more attacker servers 102, two or more victim servers 110, as well as computers other than servers, including a server pool. Indeed, one or both of the attacker server 102 and victim server 110 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated the illustrated servers 102 and/or 110 may be adapted to execute any operating system, including Linux, UNIX, Windows, Mac OS, or any other suitable operating system.

The victim client 106, as shown, is communicably coupled to the victim server 110, such as through an internal intranet or network, all or a portion of the World Wide Web, or other network (e.g., VPN, LAN, WAN, MAN, or otherwise). The victim client 106 may be any computing device operable to connect to or communicate with at least the servers 102 and 110 via the network 114 or other networks using a wireline or wireless connection. In general, the victim client 106 comprises an electronic computer device operable to receive, transmit, process, and store any appropriate data associated with the system 100 of FIG. 1. It will be understood that there may be any number of victim clients 106 associated with, or external to, system 100. Further, the term "client" and "user" may be used interchangeably as appropriate without departing from the scope of this disclosure. Moreover, while the victim client 106 may be used by a single user, this disclosure contemplates that many users may use one computer, or that one user may use multiple computers. As used in this disclosure, the victim client 106 is intended to encompass a personal computer, touch screen terminal, workstation, network computer, kiosk, wireless data port, smart phone, personal data assistant (PDA), one or more processors within these or other devices, or any other suitable processing device. For example, the victim client 106 may comprise a computer that includes an input device, such as a keypad, touch screen, mouse, or other device that can accept user information, and an output device that conveys information associated with the operation of the victim server 110 or the victim client 106 itself, including digital data, visual information, applications, or otherwise.

Generally, network 114 facilitates wireless or wireline communications between the components of the system 100, such as between the attacker server 102 and the victim client 106, as well as with any other local or remote computer, such as additional clients, servers, or other devices communicably coupled to network 114 but not illustrated in FIG. 1. The network 114 is illustrated as a single network in FIG. 1, but may be a continuous or discontinuous network without departing from the scope of this disclosure, so long as at least a portion of the network 114 may facilitate communications between senders and recipients. The network 114 may be all or a portion of an enterprise or secured network, while in another instance at least a portion of the network 114 may represent a connection to the Internet. Further, all or a portion of the network 114 can comprise either a wireline or wireless link. Example wireless links may include 802.11a/b/g/n, 802.20, WiMax, and/or any other appropriate wireless link. In other words, the network 114 encompasses any internal or external network, networks, sub-network, or combination thereof operable to facilitate communications between various computing components inside and outside the illustrated system 100. The network 114 may communicate, for example, Internet Protocol (IP) packets, Frame Relay frames, Asynchronous Transfer Mode (ATM) cells, voice, video, data, and other suitable information between network addresses. The network 114 may also include one or more local area networks (LANs), radio access networks (RANs), metropolitan area networks (MANs), wide area networks (WANs), all or a portion of the Internet, and/or any other communication system or systems at one or more locations.

Generally, the firewall 116 comprises a software or hardware-based network security system that controls the incoming and outgoing network traffic (e.g., to and from the victim client 106) by analyzing the data packets and determining whether they should be allowed through or not, based on a rule set. In other words, the firewall 116 establishes a barrier between a trusted, secure internal network (e.g., including the victim client 106 and the victim server 110) and another network (e.g., the network 114) that is not assumed to be secure and trusted.

This example system 100 may be used, e.g., by the attacker server 102, to conduct one or more attacks on the victim system (e.g., victim client 106 and victim server 110) to gain access to otherwise secure data, e.g., stored on the victim server 110). For example, such attacks may include a DNS Rebinding attack. DNS Rebinding is a term that describes a class of Web browser-based attacks that may under-mine the SOP through sophisticated mapping of DNS entries to restricted network resources.

For example, a decision whether a given JavaScript (or other script or applet) is granted access to a certain resource (e.g., browser window or network location) is conventionally governed by the SOP. As described above, the SOP relies on the domain property of the respective entity's origins. However, the HTTP protocol does not require any information about the requested domain. The actual HTTP connections are made using the server's IP.

Generally, DNS Rebinding attacks exploit this aspect of the SOP by utilizing short-lived DNS entries to gain full cross-domain read/write privileges. For instance, an attacker (e.g., attacker server 102) can issue a short-lived DNS entry for an attacker controlled web page (e.g., a web page under the same control as the attacker server 102, such as a web page hosted on the server 102 or other attacker-controlled appliance). When a victim (e.g., victim client 106) visits this particular Web site, the victim's browser fetches the DNS entry, connects to the provided IP address, and downloads attacker-controlled JavaScript or plug-in code. This code is capable of creating network connection to same-domain hosts due to the SOP. In the meantime, the DNS entry expires and therefore, as soon as another request is conducted towards the same domain (e.g., the victim client IP address 108), a new DNS entry has to be fetched. The attacker is able to exploit this behavior by altering the domain-to-IP-mapping. By providing an IP address of the victim's intranet (e.g., server IP address 112), the browser (e.g., on the victim client 106) is made to connect to the intranet IP as soon as the JavaScript conducts a same-domain request. As the IP is not a part of the Same-Origin check, the SOP is still fulfilled and, therefore, the attacker-controlled script is granted access to the response of the intranet host. Potential offensive scenarios are not limited to information leakage attacks on internal servers. DNS Rebinding can, for instance, also be used to conduct click fraud, defeating IP-based authentication, or hijacking of IP addresses, among other offensive scenarios.

Within this overall framework, a DNS Rebinding attack may comprise one or more of multiple attack techniques. For example, a DNS Rebinding attack may utilize DNS records, which returned two IP addresses for the a victim's domain: (1) the IP of the attacker's server (e.g., attacker IP address 104), from which a script or applet was loaded; and (2) another IP pointing to the target of the attack (e.g., the client IP address 108). As the attacker controls an order of the values in the DNS response, the script or applet could be tricked to connect to the target system (e.g., the victim server 110). In some aspects, this form of DNS Rebinding attack can be mitigated by the introduction of strict IP based access control. For example, after the initial loading of a script or applet (e.g., at the victim client 106), the only IP that the script or applet is allowed to access is the IP address it was originally obtained from (e.g., the attacker server 102), regardless of information provided by DNS. This restriction is maintained for the entire lifespan of the script or applet.

As another example form of a DNS Rebinding attack may be found with domain name relaxation. In this case, the malicious JavaScript was hosted on a subdomain of the adversary's server, e.g., sub.attacker.org. The DNS entry for the father domain attacker.org pointed to the internal host. After being loaded in the victim's browser (e.g., through the victim client 106), the script relaxed its document.domain value to the father domain and, thus, was subsequently granted access to the internal server (e.g., the victim server 110). In some aspects, this type of attack can be mitigated by implementation of explicit "pinning" of the domain-to-IP mapping for the lifetime of the Web page. In addition, to mitigate the domain relaxation based attack, it may be required that both parties in a domain relaxation scenario assign the document.domain property to the same value.

As another example form of a DNS Rebinding attack, a Web browser (e.g., Internet Explorer, Firefox, etc.) may be caused to drop any domain-to-IP mapping, which in turn re-enables the rebinding attack for JavaScript, Flash applets, and the LiveConnect JavaScript-to-Java bridge to utilize Java methods in rebinding attacks. For example, plug-in technologies such as Flash and Java may enable the usage of low-level socket communication in rebinding. This may expand the resulting attack surface towards non-HTTP network services. Furthermore, socket connections could be utilized to circumvent HTTP-based countermeasures, such as host header checking.

Conventional techniques for rebuffing a DNS rebinding attack include, for example, DNS Pinning, internal IP address range limiting, and application-layer protection. For example, in DNS Pinning, a Web resource's IP-to-DNS mapping is maintained for a prolonged timespan, ideally exceeding the lifetime of the resource (e.g., the script, applet, or otherwise). While being able to provide basic protection properties, DNS Pinning has security and functionality drawbacks. For example, DNS pinning may be inherently incompatible with all technical measures that rely on dynamic and potentially changing DNS answers, such as load balancing, active failover, disaster recovery, or Content Distribution Networks. Also, DNS Pinning may be unable to protect secure resources (e.g., on the victim server 110) if Web proxies are part of the communication path to the server or in content caching scenarios (e.g., as discussed below with respect to the HTML5 application cache).

Due to the specific nature of DNS Rebinding, internal servers (e.g., victim server 110) may be a prime target of an attack. Hence, several conventional techniques may attempt to protect internal network resources against external scripts. In general, such approaches primarily protect resources hosted on the "private" netblocks (e.g., of the IPv4 space, as defined by RFC 1918). Such protection can be implemented on the DNS level, for example a DNSWall is a daemon that is designed to be used in conjunction with an existing recursive DNS resolver. The DNSWall filters out RFC 1918 addresses in DNS responses. Also, the OpenDNS service may offer a similar option. Furthermore, similar protection can be achieved within a Web browser. Opera, for example, refuses script code which was obtained from an external source to access internal RFC 1918 IP ranges. The Firefox extension NoScript can be configured to do the same.

Providing protection by restricting access to private IP ranges is also necessarily incomplete. For one, network-based access control is not limited to ranges of address allocation for private internets (e.g., RFC 1918 ranges). In addition, bigger organizations, such as large companies or universities, do not always use RFC 1918 addresses for their internal networks. Furthermore, with respect to certain Web browsers (e.g., Internet Explorer version 6), many use cases for RFC 1918 addresses cease to exist, as there is no shortage of addresses for such browsers. Finally, even in cases where access to the private IP ranges is protected against DNS Rebinding attacks, under certain conditions, the attacker (e.g., attacker server 102) can use rebinding to gain privileged access to local network resources if such resource listen both on a private and a public IP address.

Application servers can implement active protection against a DNS Rebinding attack. For example, a requirement of authentication before an internal server can be accessed may be implemented. As the rebinding attack utilizes the adversary's domain (e.g., the victim client IP address 108), preexisting authentication credentials, such as session cookies, cannot be abused by the attacker and, hence, the restricted data (e.g., stored on the victim server 110) should be safe. Additionally, servers can implement host-header checking. For instance, the attacker's HTTP requests carry the domain name of the attacker's server (e.g., attacker server 102) in their host-header. Hence, the attack can be spotted and the access can be stopped, which usually can be done by throwing a 400/500 server error or responding with a standard error message.

However, such measures do not resolve the issue completely. A Web browser may still allow the script (or other attacker resource) to omit the request and receive the response. So even though, the server's data cannot be obtained (e.g., from the victim server 110), the attack vector may still leak valuable information to the attacker, such as validation that the server exists and material to do server-type and software fingerprinting. Also, host-header checking can be error-prone, for example, in a Common Unix Printing System (CUPS) scheme. For instance, even though CUPS implements a check, the implementation is incomplete and may grant an attacker access to a subset of the tool's data. Further, such defensive techniques have to be introduced manually for each server on the application layer (e.g., each victim server 110 of multiple and perhaps hundreds of servers 110).

In some aspects, DNS Rebinding attacks may circumvent DNS Pinning by using an HTML5 Offline Application Cache, such as an HTML5. The underlying idea of DNS Pinning is to avoid the interaction of content that is served via the same origin, but received from different hosts. As soon as a DNS query is conducted, the Web browser (e.g., on the victim client 106) pins the received domain-to-IP mapping. Subsequent requests conducted towards this origin (e.g., the victim IP address 108) are then exclusively sent to the host utilizing the "pinned" IP. Thus, while DNS pinning is active, content fetched from one origin always corresponds to the same host. Ideally, the pinning information should be stored as long as a resource resides within the Web browser. However, as mentioned already, DNS Pinning interferes with techniques such as load-balancing, active failover and disaster recover. The longer the pinning times, the larger the negative effect may have on these techniques. In the worst case, if the domain-to-IP mapping information are stored by the Web browser for an unlimited amount of time, these techniques would be more or less useless. Therefore, pinning durations differ substantially from browser to browser. However, all major browsers have one thing in common. As soon as the user closes the Web browser, the pinning information is automatically deleted. This also affects Web content that is stored in the browser's cache.

The basic attack via cached content may be similar to the general DNS Rebinding attack. In this case, however, it is assumed that DNS Pinning is in place, and therefore, the basic attack does not work as described. When caching comes into play, an attacker (e.g., the attacker server 102) can re-enable the attack. This advanced attack (e.g., via cached content) may include two separate steps. In the first step, the attacker server 102 lures the victim client 106 onto a prepared Web site and forces the Web browser of the victim client 106 to cache the attacker controlled contents (e.g., a script, applet, or other content). As DNS Pinning is active, this content is not yet able to launch a DNS Rebinding attack. However, browsers do not persist the domain-to-IP mapping but dispose it eventually. In the second step, at some later point in time, the attacker server 102 again lures the victim client 106 onto the Web page. This time, the content is fetched from cache on the victim client 106, and therefore, no DNS Queries or TCP connections are created. Only the origin information (protocol, domain, port) and the resources are retrieved from cache. When the cached resources attempt to create network connections to its own origin, no domain-to-IP mapping is available and therefore a fresh DNS Query is conducted opening up a vector for DNS Rebinding.

In some aspects, a browser's caching behavior is unpredictable and the adversary has only limited means to influence which content actually gets cached. The browser cache (e.g., on the victim client 106) has a fixed size and, in general, handles cached content in a first-in, first-out fashion. Given the size of current Web sites, even a moderately used browser's cache fills up quickly and even recently cached content often gets discarded quickly. Hence, depending on the given circumstances, the chances of keeping the attack script (e.g., from the attacker server 102) in the cache of the victim client 106 long enough for a successful attack tend to be small. The HTML5 Offline Application Cache ("AppCache"), however, as compared to a traditional cache, may provide an attacker with two novel capabilities that make attacks that get around DNS Pinning feasible.

First, using the AppCache manifest, the attacker server 102 can advise the browser to cache certain resources (e.g., attacker script or other content) in a reliable way. As soon as the resources are stored within the AppCache, they reside in the browser for a potentially unlimited amount of time (e.g., until the attacker's application or the user decide to empty the cache manually).

Figures 2A, 2B:
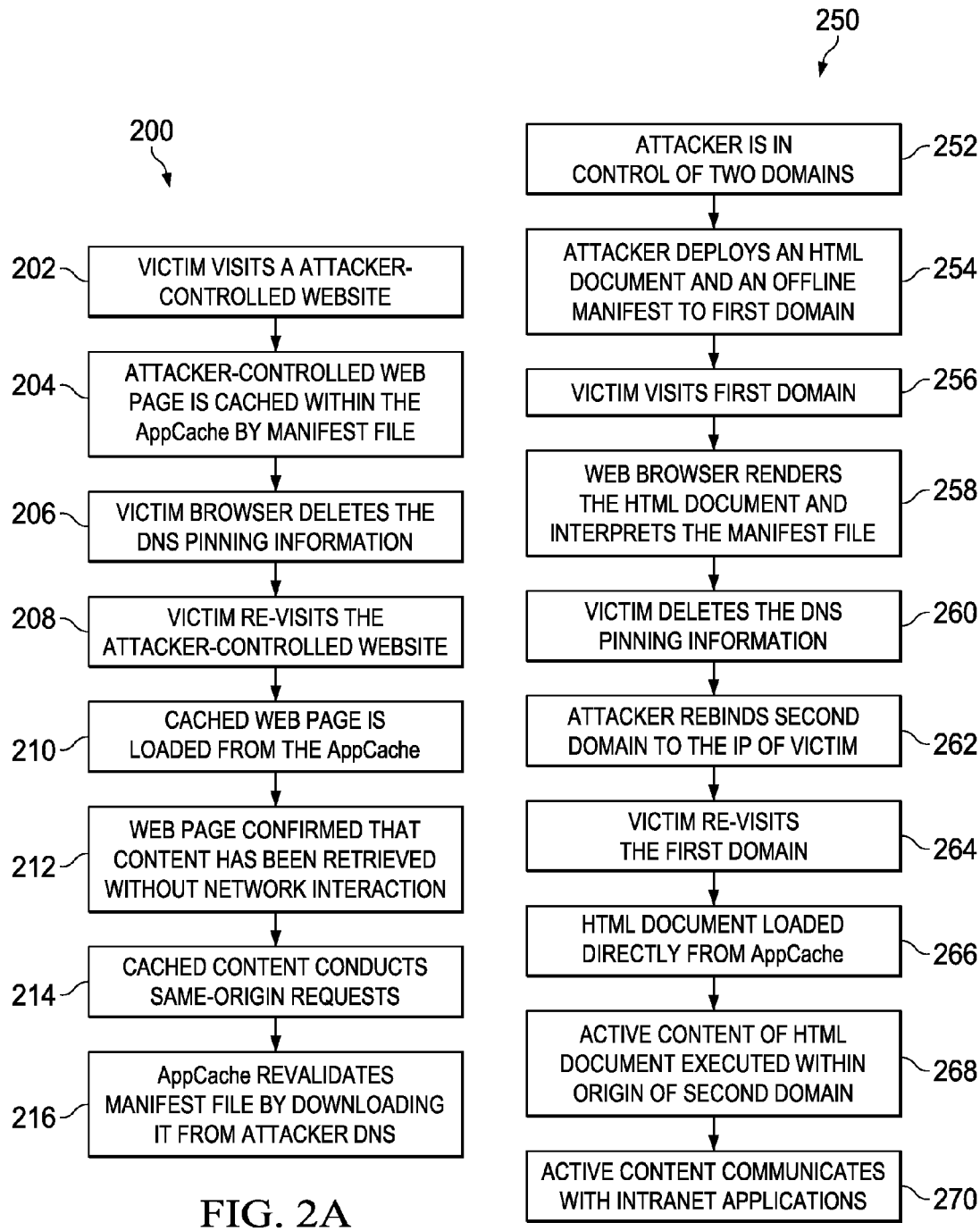
FIGS. 2A-2B illustrate example methods for gaining unauthorized access to secure content by utilizing an HTML5 offline application cache in a DNS Rebinding attack.

Second, the AppCache provides an API that allows JavaScript to identify whether it was loaded from cache or via the network. Based at least in part on these two characteristics about the AppCache, an attacker can conduct reliable DNS Rebinding attacks. With reference to FIG. 2A, for instance, an example method 200 of using the AppCache to conduct a DNS Rebinding attack is illustrated. In step 202, an attacker (e.g., attacker server 102 or an entity in control of such server 102) lures a victim (e.g., victim client 106) onto a particular Web site. In some cases, the attacker may not actively lure the victim but the victim may simply visit the Web site of the attacker. The Web site can be hosted from the attacker server 102, for example, and may be controlled, developed, and/or maintained by an entity that owns and/or controls the server 102.

In step 204, the Web site caches an attacker-controlled Web page within the AppCache (e.g., by using a manifest file). In step 206, the browser (e.g., on the victim client 106) deletes the DNS Pinning information. Subsequently, in step 208, the user of the victim client 106 visits the same web site again. Next, in step 210, the Web page is loaded from the AppCache and, thus, no domain-to-IP mapping is available. In step 212, using the AppCache's JavaScript API for example, scripts contained in the web page can verify that they have been retrieved without network interaction. Next, in step 214, the cached script conducts same-origin requests (e.g., to the victim server 110) towards the IP returned in the second DNS query (which the attacker server 102 controls completely). After the attacker's payload was loaded from cache, in step 216, the AppCache revalidates the manifest file by downloading it from the attacker's domain. As this domain now points to the victim client IP address 108, the manifest will not be found and the cache will automatically be deleted (including the evidence for the attack). However, the attack has already taken place.

The attack demonstrated in method 200 only targets one specific victim. Nevertheless, the attack scheme can be extended to conduct large-scale attacks. For example, with reference to FIG. 2B, an example method 250 of using the AppCache to conduct a DNS Rebinding attack that uses an attacker subdomain is illustrated. For instance, instead of conducting a rebinding attack directly on the main domain, the attacker could simply forward each user onto a distinct subdomain that can be rebound separately. As soon as one DNS query arrived at the attacker's DNS server for a specific subdomain, the DNS server could rebind the IP immediately. In a first general step, the user's browser pins the IP and therefore only sends one initial DNS request. In a second general step, if a second request arrives, the user's browser must have deleted the pinning information and is in need to refresh the information (opening the DNS Rebinding vector). The only challenge the attacker has to solve in general step two is to forward the user to the same subdomain as utilized for this specific user in general step. To identify whether the user has already conducted general step one, the attacker could simply utilize cookies that store the subdomain information on the victims computer until the next visit.

In some instances, multiple domains may be used in a DNS Rebinding attack that utilizes the HTML5 Offline Application Cache. This technique may even be more robust as compared to the attack method described with method 200. For example, the method 200 may have a weakness: For example, the AppCache revalidates the cache manifest after each access. If the manifest changes, files in the cache will be updated/deleted accordingly. Hence, in the last step of the attack described in method 200, after the malicious script was fetched from the AppCache, the browser revalidates the manifest file from the attacker's domain. Since the domain is, at this point in time, bound to the intranet host's IP, the browser requests the manifest file from the intranet host. As the file will typically not be available on the rebound server, the browser deletes the cached content. Nevertheless, the attacker is able to execute the malicious script at least once, as the cache validation takes place after the access to the cache. However, if the attack fails, e.g., because the user closed the browser before the script was executed completely, the attacker has to start the whole process of rebinding from scratch. For large-scale, automated attacks this is not a feasible solution. In order to overcome this issue, a more sophisticated attack scenario can be used. In this scenario, the deletion of cached content may be prevented after the rebinding step has taken place by utilizing two distinct domain names. Thereby, an attack may be repeated multiple times without the need for rebinding a domain name over and over again.

In step 252 of method 250, an attacker is in control of two domains (attacker1.org and attacker2.org, which may, for example, be hosted on separate servers 102) and the corresponding DNS server. In step 254, in order to setup a DNS Rebinding attack, the attacker deploys an HTML document and an offline manifest to attacker1.org. The HTML document, for example, may embed (e.g., via frame, object or embed tags) active content (e.g., JavaScript, SVGs, Flash or Silverlight applets, or other content) served by attacker2.org.

Next, in step 256, the attacker lures a user (e.g., victim client 106) onto attacker1.org. In step 258, the user's browser renders the malicious HTML document and interprets the corresponding manifest file. Due to the instructions contained within the manifest, the browser caches the HTML document as well as, for example, the active elements.

In step 260, by closing the browser, the user (e.g., on victim client 106) deletes the DNS pinning information. In step 262, the attacker rebinds attacker2.org to the IP of an intranet host.

In step 264, the attacker again lures the user onto attacker1.org. In step 266, the Web page and the active elements are loaded directly from AppCache. In step 268, as the page utilizes embed, frame, or object tags for embedding the active elements, these elements are executed within the origin of attacker2.org. In step 270, due to the fact that attacker2.org is bound to the intranet IP, the active content is now able to communicate with intranet applications (e.g., between victim server 110 and attacker server 102).

In method 250, as opposed to the attack descried in method 200, the manifest file resides on a domain (e.g., attacker.org) that is not subject to rebinding. Hence, when the cache validation takes place, the manifest is still available. Consequently, the browser does not delete the cached content. For example, in a corporate wiki that contains a multitude of information, the extraction and transfer of the data to the attacker would consume a large amount of time. However, the attacker can only extract the data while the user still visits the malicious Web site. If the user leaves the Web site before all parts of the data were extracted, the attacker is able to again lure the user onto the vulnerable page to continue the extraction process instead of needing to reiterate the first rebinding step.

Further, browser implementations differ in the way they utilize the cache when it comes to cross-domain caching and in the way they defend against rebinding attacks. Caching of HTML and SVG documents works across all browsers in the same-domain scenario. However, when it comes to cross-domain caching, the behaviors of browsers differ substantially. For the method 250, a distinct document embeds an HTML or SVG file from a second domain via frame or object tags. The manifest file resides on the first domain, hence referencing the HTML/SVG file across domain boundaries. While WebKit-based browsers (e.g., Safari, Chrome) and Internet Explorer do not fetch such embedded cross-domain resources from cache, Firefox and Opera expose a different behavior. Opera fetches both, content embedded via frame and via object tags, from the AppCache. Firefox, however, only fetches HTML/SVG documents from cache when they are embedded via object tags. Therefore, the attack of method 250 does not work within Safari or Chrome when utilized in combination with JavaScript. To overcome this issue an attacker can utilize plug-ins such as Flash or Silverlight.

All popular desktop browsers except Internet Explorer 10 support the cross-domain caching of Silverlight applets within the offline application cache. This behavior can be abused to conduct DNS Rebinding attacks within these browsers. A Silverlight applet is, similar to JavaScript, able to conduct requests and read the corresponding responses. Hence, the abilities are similar to the HTML/SVG case, but the desktop browser support for the complex attack is better. Mobile browsers, however, are not able to execute Silverlight applets.

In earlier versions of Silverlight, it was possible to also create arbitrary socket connections to same-domain hosts. Fortunately, those capabilities are limited by the underlying security model, which only allows opening of a socket connection when the receiving host explicitly grants this connection by setting up a whitelisting policy on port 943. If port 943 is closed, the Silverlight plug-in attempts to download the policy file from the Web server's root directory. Using the HTML5 Offline Cache, an attacker is able to cache such a cross-domain policy at the Web server level. This allows an attacker to open arbitrary socket connections to the rebound IP. As this behavior was already misused in earlier rebinding attacks, Microsoft limited the connection capabilities of Silverlight to a very restricted port range (4502-4534), effectively reducing the impact of such attacks.

Similar to Silverlight, browsers also cache Flash applets within the AppCache. Hence, Flash can be used as an alternative to Silverlight when conducting a DNS Rebinding attack with multiple domains (e.g., method 250). Thereby, Flash also has the ability to create HTTP requests towards same-origin resources without restrictions. Flash only includes the protocol and the domain into its cross-domain decision making process. Hence, a Flash applet is able to send requests to any same-domain port and receive the corresponding responses. This behavior can be used to conduct DNS Rebinding attacks on non-HTTP-based intranet services.

Java applets do not utilize the browser's App-Cache. Instead, Java uses its own caching mechanism that defends against DNS Rebinding by storing the IP address of the host that served the applet. When conducting a HTTP or Socket connection the applet is only allowed to connect back to the same IP address.

Beside Flash, Silverlight, and Java, there is a multitude of other plug-ins which can potentially be abused to conduct the presented attacks. If a plug-in applet can be cached with in the browser's Offline Application Cache, it is very likely that it can also be used for the outlined rebinding attacks.

As illustrated, technologies can be abused by an attacker to gain novel capabilities in the context of a DNS rebinding attack. Tables 1 and 2, below, outline which desktop and mobile browsers are vulnerable to the presented attacks of method 200 and 250. As seen within the tables, the attack including a single domain (denoted as SD) works within every browser. The attacks comprising two distinct domain names (denoted as TD) affect mainly desktop browsers. The reason for this is the missing plug-in and SVG support within mobile browsers.

TABLE 1

Desktop browser & Attack Overview

| Browser | SD | TD SVG | TD F | TD SL |
|---|---|---|---|---|
| IE 10 | ✓ | — | — | — |
| Firefox 14.0.1 | ✓ | ✓ | ✓ | ✓ |
| Chrome 21 | ✓ | — | ✓ | ✓ |
| Safari 5.1 | ✓ | — | ✓ | ✓ |
| Opera 12 | ✓* | ✓* | ✓* | ✓* |

*Opera prevents access to RFC 1918 addresses.

TABLE 2

Mobile browser & Attack Overview

| Browser | SD | TD SVG | TD F |
|---|---|---|---|
| Mobile Safari | ✓ | — | n.a. |
| Android Browser | ✓ | n.a. | Crash |
| Mobile Chrome | ✓ | Error | n.a. |
| Mobile Firefox | ✓ | — | ✓ |

Just as DNS rebinding attacks can be conducted within the framework of system 100, system 100 may also implement the eSOP to stop or help prevent such attacks, even such attacks that utilize the HTML5 Application Cache as described above. As previously described, the SOP may be extended to include Web server-provided input. In some implementations of the eSOP, a Web origin that can be checked to protect against a DNS Rebinding attack includes information that indicates an origin of a server (or other appliance) from which Web content originates. For instance, the conventional triple-based SOP (e.g., {protocol, domain, port}) is extended to include a fourth component that is provided by a server (e.g., a Web server domain). For example, HTTP responses of a given server carry explicit, server-provided information of the server's trust boundaries, or "server-origin." Thus, in the eSOP, a Web origin consists of the quadruple {protocol, domain, port, server-origin}. In consequence, when a browser (e.g., Internet Explorer, Chrome, Safari, Opera, Firefox) conducts an eSOP check for access to secure content, not only does the protocol/domain/port triple have to match, but also the server-origin values. For example, a script may execute under the origin {http, example.org, 80, example.org}. This script attempts to access a document in an iframe that also has the origin {http, example.org, 80, example.org}. Because all four elements of the respective Web origins match, the eSOP is satisfied, and the access is granted to the iframe.

As demonstrated above, DNS rebinding is a fundamental, protocol-layer flaw of the SOP, which is not solvable with the existing means. Available remedies are either incomplete (e.g., protecting specific IP ranges) and/or have to be implemented explicitly on the server-side's application layer (e.g., host header checking). In contrast, the eSOP, as explained more fully below, can extend the Web interaction paradigm in a non-disruptive manner to enable a robust protection.

The eSOP can advantageously include one or more of the following features by providing a fundamental solution that is capable of solving DNS Rebinding completely. First, the eSOP is a client-side security policy and, therefore, aspects (e.g., all or most) of the policy decision and enforcement process are conducted in the Web browser (e.g., of the victim client 106). Second, the eSOP does not explicitly implement protection or decision logic on the server-side's application layer. Instead, the eSOP provides transparent protection by default on the protocol layer. Third, the eSOP does not rely on non-security features (e.g., the host header) but, instead, introduces dedicated functionality only where necessary. Fourth, the eSOP can be implanted as a backward compatible solution so that, if a given application scenario involves an entity (e.g., Web server or browser) that does not yet implement the eSOP, the Web application does not break and the security properties should revert to the currently established state (e.g., a conventional SOP).

The eSOP advantageously solves the DNS Rebinding problem by taking into account the principle that, while central to the purpose of the SOP, is not involved in the actual policy decision of the SOP: the server-origin. The SOP enforces access control in the browser, based on the "origins" of the corresponding resources. In this context, such origins are derived from the URLs that are associated with the interacting resources—usually the URLs of the enclosing document objects. Hence, the semantics of the SOP are built around two principals: The browser for enforcing the policy and the server(s) for providing the resources which are the subjects of the policy decision.

However, the entities involved in the implementation of the SOP differ. While the browser remains in charge of enforcement, the underlying information is not provided by the involved Web server(s). Instead, the network in the form of Domain Name System and IP addresses is utilized to associate the URL-values to the server resources. Thus, the principal that is central to the SOP's purpose, the server, is not even involved in the actual policy decision. Even worse, security characteristics associated with the server are governed by network resources that are not necessarily controlled by the server's owner. As a consequence, a crucial mismatch exists between the semantics and the implementation of the SOP. As seen above, DNS Rebinding takes advantage of this mismatch. In a rebinding scenario, the attacker utilizes network resources under its control to undermine the security characteristics of the server.

The Web application model spans three principals in total: the browser, the server, and the network. Hence, to address the currently existing mismatch between policy semantics and implementation, the eSOP involves the server in the policy decision process.

Hence, to resolve this shortcoming, the eSOP policy and implementations include Web server-provided input. The eSOP extends the current, triple-based SOP with a fourth component that is provided by the server. In some implementations, the eSOP may be implemented in the following manner. HTTP responses of a given server carry explicit, server provided information of the server's trust boundaries, deemed herein as the server-origin. Thus, in some implementations of the eSOP, a Web origin consists of the quadruple {protocol, domain, port, server-origin}. Whenever the browser conducts an eSOP check, not only the classic protocol/domain/port triple has to match, but also the server-origin values. In simple cases, a Web origin's domain and server-origin values should not differ. For instance, a script running under the origin {http, example.org, 80, example.org} attempts to access a document in an iframe which also has the origin {http, example.org, 80, example.org}. All four elements of the respective Web origins match, thus, the eSOP is satisfied and the access is granted.

As is apparent, however, such a simplified case is not always representative of the real-world Web paradigm. For example, Web applications can be accessed via multiple domain names. Many Web applications, for instance, do not distinguish between the main domain name (e.g., example.org) and its "www" counterpart (e.g., www.example.org). Similar scenarios exist for applications accepting requests for multiple top-level domains (e.g., example.com and example.net). Hence, for resources served by such applications, it is not straight forward to decide what their corresponding server-origin is. The eSOP, in some implementations, permits that the server specifies more than one domain value as its server-origin. This way, the server-origin may precisely specify a server's trust boundaries, e.g., the set of domains which it grants access in a same-origin context. Furthermore, some implementations of the eSOP are satisfied if and only if the protocol/domain/port values of both quadruples match and the domain value of the acting origin (e.g., the origin of the script) is included in (e.g., within the set of) the server-origin of the resource which the script tries to access.

A more complex example case is as follows. A Web application available via example.org and www.example.org specifies its server-origin as a tuple of both domains: <example.org, www.example.org>. A script running in a document under the origin {http, example.org, 80, <example.org, www.example.org>} tries to access a document in a iframe which also has the origin {http, example.org, 80, <example.org, www.example.org>}. As the script's domain value (example.org) is included in the target document's server-origin set, <example.org, www.example.org>, then the eSOP is satisfied and, thus, the access is granted.

The eSOP may also adequately handle domain name relaxation. The specific matching criterion for server-origin, for example, also allows simple and robust handling of domain relaxation via setting the document.domain property during client-side execution. For example, as long as the newly set origin is still in the target resource's list of domains, the eSOP allows access under the relaxed domain values. This works in situations in which the individual subdomains are handled by separate Web servers with potentially different server-origin configurations.

In another example, a Web application is hosted on example.org, which has multiple subdomains, including sub.example.org. The application's subdomains are handled by dedicated Web servers. Furthermore, the example.org server hosts all resources that are shared among the subdomains. A script is executed under the extended Web origin {http, sub.example.org, 80, <sub.example.org>}. Furthermore, the browser provides a reference to a resource from the main application with the origin {http, example.org, 80, <example.org>}. The script assigns the value example.org to the document.domain property, thus, effectively relaxing its domain value to the fathering domain. As a result, the script's effective origin is now {http, example.org, 80, <sub.example.org>}. Consequently, the eSOP is now satisfied in respect to the referenced resource, as the script's domain value is included in the domain set of the resource's server-origin, and the access is granted.

In some implementations of the eSOP, access may be granted to a resource if and only if: {protocol1, domain1, port1}=={protocol2, domain2, port2} and domain1 is in the set of server-origin2. If the server-origin2 property is empty, then the second criteria always evaluates as "true." In some aspects, the second criteria of the eSOP provides robustness and backwards compatibility with the conventional SOP. In addition, to facilitate flexible and easy configuration, the eSOP may follow the example of the Content-Security Policy format and allow the usage of wildcards for subdomain values within the set of domains in the server-origin (e.g., <*.domain.com>).

In some implementations of the eSOP, the server may communicate the server-origin property of resources to the browser through a dedicated HTTP response header X-Server-Origin that carries the server-origin property in the form of a comma-separated list. The HTTP response header may advantageously include several features. First, it is compatible with the caching behavior of Web browsers. Web browsers are already required to cache HTTP response headers along with the actual resources, as they otherwise would not be able to properly interpret the cached content after retrieving it from storage. Second, unlike DNS or IP-based protection schemes, properties communicated via HTTP response headers are preserved when the browser accesses the network via a Web proxy. Third, adding features using new response headers is non-disruptive, as older browsers simply ignore unknown response headers.

Implementations of eSOP are capable of preventing DNS Rebinding attacks. For example, to conduct a DNS Rebinding attack, the adversary maps the DNS setting of a domain to the IP address of the targeted Web server. However, the attacker-controlled domain value is not in the Web server's trust boundary. In consequence, the value will not be included in the list of domain values in the server's server-origin property. Therefore, the eSOP check will necessarily fail and access will not be granted to content, e.g., on the victim client 106 and/or victim server 110.

Figure 3:
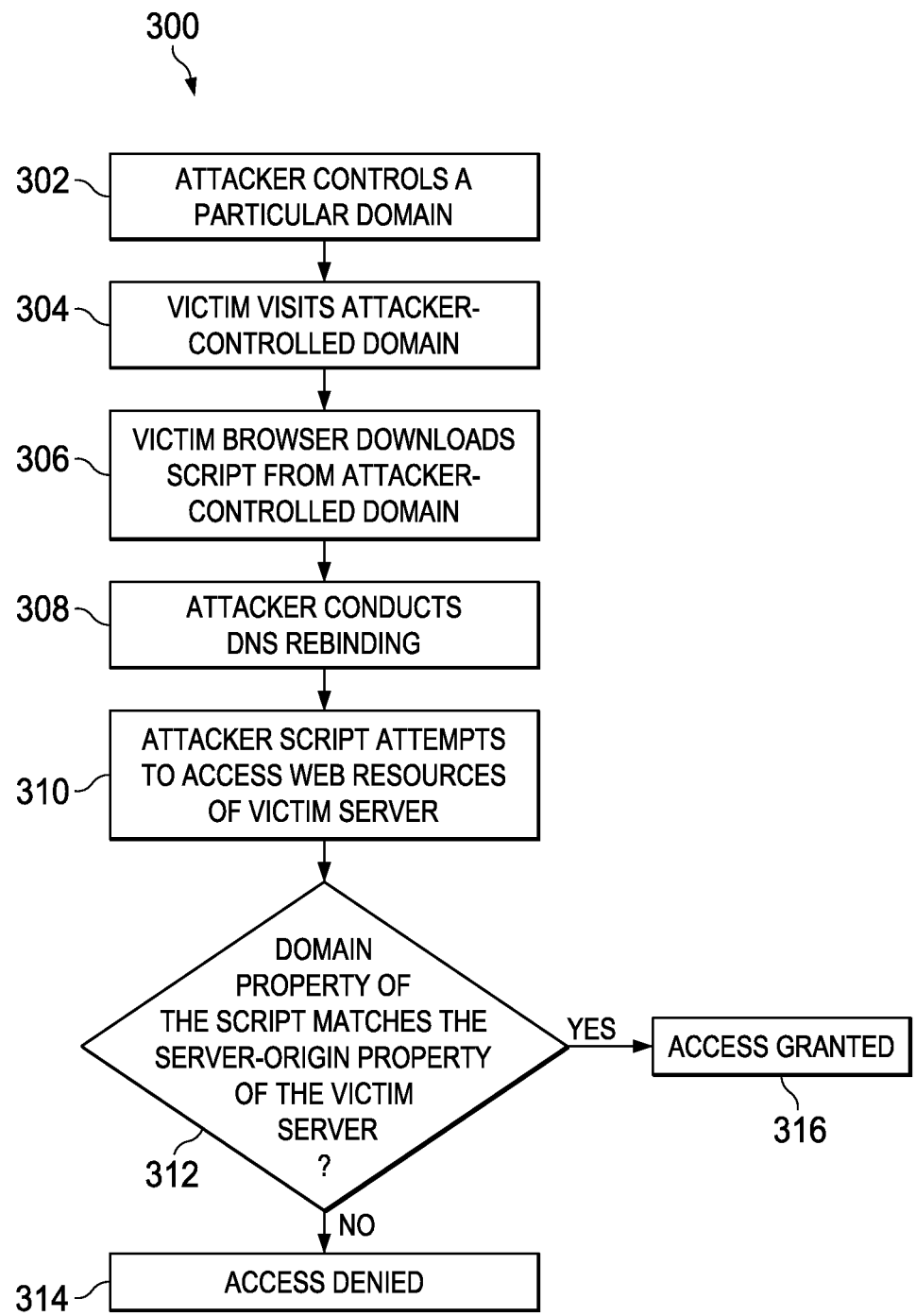
FIG. 3 illustrates an example method for preventing unauthorized access to secure content against a DNS Rebinding attack.

Turning to FIG. 3, an example method 300 for preventing unauthorized access to secure content against a DNS Rebinding attack by using the eSOP is shown. In step 302, an attacker controls the domain attacker.org. The attacker's goal is to access an internal wiki server under the domain wiki.corp, which sets a corresponding server-origin. In step 304, the attacker tricks the victim into accessing (or the victim willingly accesses) the attacker.org, which still is mapped to a Web server IP under the attacker's control. In step 306, the script is handled (e.g., downloaded) by the browser (e.g., of the victim client 106) under a Web origin of the form {http, attacker.org, 80, < . . . >}. In this example, the Web origin's server-origin property is fully controlled by the attackers, as the attacker creates the corresponding HTTP response. However, this does not cause any issues with the eSOP, as the server-origin of the acting script is irrelevant for the eSOP decision process.

In step 308, the attacker conducts a DNS Rebinding step (e.g., as described above with respect to FIGS. 2A-2B). Subsequently, the DNS entry of attacker.org points to the IP address of the internal server (e.g., IP address 112 of victim server 110). From this point on, the browser (e.g., of victim client 106) will interpret all resources from the server under the Web origin {http, attacker.org, 80, <wiki.corp>}. In step 310, the attacker's script attempts to access Web resources that are provided by the internal server (e.g., victim server 110). In step 312, the browser determines whether the domain property of the script matches the server-origin property of the internal server, in this case, wiki.corp. As the attacker's script carries the domain property attacker.org, which is not included in the list of domains in the server's server-origin (e.g., wiki.corp or subdomains of wiki.corp), in step 314, access is denied to the content of the internal server (e.g., victim server 110). Thus, the attack fails, even though the SOP tuple of protocol/domain/port is satisfied, because the script origin {http, attacker.org, 80} matches the resource origin, due to DNS Rebinding, is also {http, attacker.org, 80}. If, in step 312, the browser determines that the domain property of the script does match the server-origin property of the internal server, then access is granted in step 316. In the case that the script origin does not include a server-origin (e.g., because the server has not implemented the eSOP) in its set of property, then the conventional SOP tuple is checked and, if matched, then access is granted.

In some aspects, the eSOP protects against attacker driven unauthorized access based on the fact that an attacker cannot control the server-origin of the internal host, which only contains domain values within the server's trust boundaries (which obviously excludes the attacker's sites). In such cases, the sites that serve as the origin of the malicious script are labeled as invalid. For Web documents with an invalid origin, caching is disabled and strict DNS Pinning is enforced for the whole browser session, effectively closing any loophole that remained in DNS Pinning.

As another example to describe this aspect of the eSOP, a Web page is retrieved by a browser using the attacker-controlled hostname, attacker.org, which resolves to the intranet IP address 10.10.10.10 (e.g., victim client IP address 108). Then, before the script tag is interpreted, the rebinding step takes place. Attacker.org now points to 6.6.6.6 (e.g., attacker IP address 104), which is owned by the attacker. Unlike JavaScript execution, HTML-based script includes are not subject to origin restrictions. Hence, a conventional or even refined SOP (e.g., that takes into account information derived from the TLS/SSL certificates of the involved Web servers in the form of the certificates' public keys, or the server's IP as a fourth factor in the origin check) has no direct effect here, and the script code is retrieved from the adversary's host, circumventing the protection of the refined policy. In the case of the eSOP, however, such situations are reliably detectable. The second condition of the eSOP holds for all HTML documents with origin {protocol, domain, port, server-origin} that were retrieved from an attacked host: domain is not in the set of the server-origin. Thus, the eSOP would still not be satisfied and access would not be granted.

As shown above, the eSOP protects against DNS Rebinding attacks without requiring additional server-side logic or specific actions on the client-side. For example, when the X-Server-Origin header is present, the browser (e.g., at the victim client 106) is capable of transparently enforcing the policy. Furthermore, due to communicating the server-origin in the form of an HTTP response header, the protection is robust in scenarios that cause other countermeasures to fail. For instance, HTTP response headers are cached alongside with the actual cached resources and, therefore, the server-origin is maintained even in long-term caching scenarios, effectively closing the DNS Rebinding attack that utilizes the AppCache.

In addition, problematic scenarios, in which the browser has no control over the domain-to-IP mapping, e.g., through a Web proxy, can be handled conveniently. The X-Server-Origin header is preserved, even if Web proxies obstruct the link between domain name and server address. Hence, the DNS Rebinding attack scenarios that rely on Java applets and JavaScript, for instance, are not feasible.

Further, the eSOP is at least as strong as the conventional SOP in that the protocol/domain/port triple may still be required to match. Thus, it is a necessary condition that the access to a resource is granted under the SOP for the eSOP to be satisfied. Therefore, implementing the eSOP does not lead to security degradation. This also means that the eSOP is fully backwards compatible to the classic SOP. In cases that either the browser does not implement the extended policy or the Web server does not provide a X-Server-Origin header, the enforced policy transparently reverts back to the standard behavior of matching protocol/domain/port.

The eSOP's server-origin matching criterion may allow for a robust and flexible handling of distributed computing environments that include multiple server installations. For example, the eSOP does not, in some implementations, require the server-origin values to match exactly, but instead, may requires that the acting domain is whitelisted in the receiving server-origin set. Hence, even in situations of slightly different server configurations, the functionality of the Web application remains undisturbed. Additionally, the eSOP may also allow server-origin settings to change in long term caching scenarios. For instance, as long as the initial domain requirements of the cached resource remain fulfilled, the server's server-origin setting can be extended or modified without causing interoperability problems.

Further, adaption of the eSOP may obliterate the requirement of DNS Pinning for security reasons completely. Hence, for servers that provide the X-Server-Origin header, the DNS TTL value can be as small as desired. No security degradation will occur when browsers respect such small TTL values. This in turn allows easy setup of highly flexible load balancing and error-correcting network setups with multiple, redundant servers.

In an example of an adaption of the eSOP to a current Web browser, a Chrome implementation of the eSOP is described as follows. In this example, the Security-Origin, which stores the "protocol, domain and port" triple of a Web site, is enhanced by adding the proposed Server-Origin. Data stored within this data structure is provided by the X-Server-Origin response header. This header can have two types of values. If the server does not send the header or sends an empty header, it is assumed that opt-out of the eSOP protection mechanism is desired. In such cases, access may be allowed regardless of the acting domain value for backwards compatibility. Additionally, the header can be set to a list of comma-separated domains. Using the stored information, rebinding scenarios may be successfully prevented.

With respect to viewports (e.g., frames or pop-ups), it may be desired to align the eSOP implementation to how browsers should handle cross-origin requests, thus allowing a popup or frame from any resource to be rendered but to deny script access if the origins do not match. Thus, in a Chrome implementation of the eSOP, the origin check can be extended to verify the server-origin as well as the protocol, domain, and port. If a Web application does not implement the extended same-origin policy, the browser falls back to the normal SOP validation and renders the page properly.

With respect to XmlHttpRequests (XHRs), the functionality for same-origin requests can be modified in the Chrome implementation of the eSOP in order to parse response header field and to grant or revoke scripting access depending on the received value. This implementation may manifest itself only as parsing and extraction of the HTTP headers, the allocation of a little amount of memory to store the server-origin, and a string comparison of the domain and the stored value. The parsing of HTTP headers is executed for any request, thus the performance impact is reduced to just one more array access.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for preventing unauthorized access to secure content, comprising:
    accessing, from a client appliance connected in a distributed network, a computing appliance through the world wide web, the computing appliance comprising a DNS server addressed by a particular domain name;
    receiving, from the computing appliance, a portion of code at the client appliance through a web browser of the client appliance,
    receiving, to a server appliance connected in the distributed network, a request to access secure content stored on the server appliance by the portion of code;
    receiving, from the server appliance, a server-origin at the web browser of the client appliance, the server-origin being a part of an HTTP response header comprising an X-Server-Origin response header and being delivered from the server appliance to the client appliance in a comma-separated list;
    comparing the domain name of the DNS server with server-origin of the secure content; and
    based on the domain name of the DNS server being exclusive of a set of server-origin values that comprises the server-origin, denying access to the request.

2. The method of claim 1, further comprising:
    prior to the comparison, caching the portion of code in a memory portion of the client appliance; and
    deleting, at the client appliance, information associated with an IP-to-DNS mapping of the portion of code.

3. The method of claim 2, further comprising:
    re-accessing, from the client appliance connected in the distributed network, the computing appliance through the world wide web;
    loading the portion of code from the memory portion of the client appliance; and
    receiving the request to access secure content at the server appliance by the cached portion of code.

4. The method of claim 2, wherein the memory portion comprises an HTML5 Application Cache in a web browser on the client appliance.

5. The method of claim 2, wherein the portion of code comprises a script and a manifest file, the method further comprising:
    interpreting, at the client appliance, the manifest file; and
    caching the script in the memory portion of the client appliance according to the interpreted manifest file; and
    saving the script in the cache, based on the interpreted manifest file, subsequent to shut down of the web browser.

6. The method of claim 1, wherein the portion of code comprises at least one of a JavaScript, an applet, a viewport, or an XmlHttpRequest.

7. The method of claim 1, wherein the portion of code is defined by a first application layer protocol and a first port associated with the portion of code, the method further comprising:
(i) comparing the first protocol to a second application layer protocol of the secure content;
(ii) comparing the first port to a second port associated with the secure content;
(iii) comparing the particular domain name to a domain name associated with the secure content;
based on at least one of the comparisons in (i)-(iii) not returning an exact match, denying access to the request.

8. The method of claim 7, wherein the domain name associated with the secure content matches the particular domain name based on DNS Rebinding.

9. The method of claim 1, wherein the step of comparing the domain name of the DNS server with a server-origin of the secure content is performed only through the web browser of the client appliance.

10. The method of claim 1, wherein an application layer of the server appliance is unaltered.

11. The method of claim 1, wherein the set of server-origin values comprises one or more subdomains of the server-origin, the method further comprising:
granting access to the request based on the particular domain name matching at least one of the one or more subdomains of the server-origin.

12. The method of claim 1, further comprising:
determining that the set of server-origin values is empty; and
based on the determination that the set of server-origin values is empty, granting access to the secure content.

13. The method of claim 1, wherein the particular domain name comprises one of a plurality of domain names of the DNS server, and the portion of code comprises an HTML document and manifest hosted on the particular domain name and an active content hosted on another of the plurality of domain names.

14. A non-transitory computer-readable storage medium coupled to one or more processors and having instructions stored thereon which, when executed by the one or more processors, cause the one or more processors to perform operations for preventing unauthorized access to secure content, the operations comprising:
accessing, from a client appliance connected in a distributed network, a computing appliance through the world wide web, the computing appliance comprising a DNS server addressed by a particular domain name;
receiving, from the computing appliance, a portion of code at the client appliance through a web browser of the client appliance,
receiving, to a server appliance connected in the distributed network, a request to access secure content stored on the server appliance by the portion of code;
receiving, from the server appliance, a server-origin at the web browser of the client appliance, the server-origin being a part of an HTTP response header comprising an X-Server-Origin response header and being delivered from the server appliance to the client appliance in a comma-separated list;
comparing the domain name of the DNS server with server-origin of the secure content; and
based on the domain name of the DNS server being exclusive of a set of server-origin values that comprises the server-origin, denying access to the request.

15. The non-transitory computer-readable storage medium of claim 14, wherein the portion of code is defined by a first application layer protocol and a first port associated with the portion of code, the operations further comprising:
(i) comparing the first protocol to a second application layer protocol of the secure content;
(ii) comparing the first port to a second port associated with the secure content;
(iii) comparing the particular domain name to a domain name associated with the secure content;
based on at least one of the comparisons in (i)-(iii) not returning an exact match, denying access to the request.

16. A system of one or more computers configured to perform operations comprising:
accessing, from a client appliance connected in a distributed network, a computing appliance through the world wide web, the computing appliance comprising a DNS server addressed by a particular domain name;
receiving, from the computing appliance, a portion of code at the client appliance through a web browser of the client appliance,
receiving, to a server appliance connected in the distributed network, a request to access secure content stored on the server appliance by the portion of code;
receiving, from the server appliance, a server-origin at the web browser of the client appliance, the server-origin being a part of an HTTP response header comprising an X-Server-Origin response header and being delivered from the server appliance to the client appliance in a comma-separated list;
comparing the domain name of the DNS server with server-origin of the secure content; and
based on the domain name of the DNS server being exclusive of a set of server-origin values that comprises the server-origin, denying access to the request.

17. The system of claim 16, wherein the portion of code is defined by a first application layer protocol and a first port associated with the portion of code, the operations further comprising:
(i) comparing the first protocol to a second application layer protocol of the secure content;
(ii) comparing the first port to a second port associated with the secure content;
(iii) comparing the particular domain name to a domain name associated with the secure content;
based on at least one of the comparisons in (i)-(iii) not returning an exact match, denying access to the request.

* * * * *